United States Patent [19]

Fesler

[11] Patent Number: 4,735,484

[45] Date of Patent: Apr. 5, 1988

[54] ACOUSTO-OPTIC FREQUENCY SHIFTER UTILIZING MULTI-TURN OPTICAL FIBER

[75] Inventor: Kenneth A. Fesler, Sunnyvale, Calif.

[73] Assignee: Board of Trustees of the Leland Stanford Junior University, Stanford, Calif.

[21] Appl. No.: 699,666

[22] Filed: Feb. 8, 1985

[51] Int. Cl.[4] .............................................. G02F 2/02
[52] U.S. Cl. ........................ 350/96.29; 350/96.15; 350/358; 350/371
[58] Field of Search ............... 350/96.29, 96.30, 96.13, 350/96.15, 353, 355, 356, 358, 370, 371

[56] References Cited

U.S. PATENT DOCUMENTS

| | | | |
|---|---|---|---|
| 3,912,363 | 10/1975 | Hammer | 350/96.17 |
| 4,018,506 | 4/1977 | Hammer | 350/96.17 |
| 4,067,643 | 1/1978 | Sugimura et al. | 350/96.15 |
| 4,086,484 | 4/1978 | Steensma | 350/96.29 X |
| 4,097,118 | 6/1978 | Hammer | 350/96.17 |
| 4,236,786 | 12/1980 | Keck | 350/96.15 |
| 4,268,116 | 5/1981 | Schmadel et al. | 350/96.29 |
| 4,312,562 | 1/1982 | Segawa et al. | 350/96.15 |
| 4,319,186 | 3/1982 | Kingsley | 350/96.29 |
| 4,386,822 | 6/1983 | Bergh | 350/96.15 |
| 4,588,296 | 5/1986 | Cahill et al. | 356/350 |

FOREIGN PATENT DOCUMENTS

| | | | |
|---|---|---|---|
| 2731722 | 1/1978 | Fed. Rep. of Germany. | |
| 52-67345 | 6/1977 | Japan | 350/96.29 |
| 55-155324 | 12/1980 | Japan | 350/96.15 |

OTHER PUBLICATIONS

F. Gfeller and H. R. Mueller, "Modulator and Tap for Optical Fiber Systems", *IBM Technical Disclosure Bulletin*, vol. 21, No. 5, (Oct. 1978) 2014-2015.

F. Gfeller, "Electroacoustic Transducers for Optical Fiber Modulator and Tap", *IBM Technical Disclosure Bulletin*, vol. 21, No. 2, (Jul. 1978), 813-14.

"Thin—film Tunable Optical Filtering Using Anisotropic and Noncollinear Acoustooptic Interaction in LiNb03 Waveguides", B. Kim et al., IEEE Journal of Quantum Electronics, vol. QE—15, No. 7, Jul. 1979, pp. 642-647.

"Optical Fibre Acousto—Optic Modulators", The Radio and Electronic Engineer, vol. 49, No. 9, Sep. 1979, pp. 460-466, D. Howard.

"Integrated—Optical Single—Side Band Modulator and Phase Shifter", *IEEE Journal of Quantum Electronics*, vol. QE18, No. 4, Apr. 1982, pp. 767-771.

"The Design of Efficient Broadband Wedge Transducers", by J. Fraser et al., *Applied Physics Letters*, vol. 32, No. 11, Jun. 1, 1978, pp. 698-700.

"Applications of Edge—Bonded Transducers to Saw Components", by C. Lardat et al., *Proceedings of the IEEE*, vol. 64, No. 5, May 1976, pp. 627-630.

"Surface Waves at Ultrasonic Frequencies", by E. G. Cook et al., *ASTM Bulletin* (TP 127), May 1954, pp. 81-84.

(List continued on next page.)

*Primary Examiner*—John Lee
*Attorney, Agent, or Firm*—Knobbe, Martens, Olson & Bear

[57] ABSTRACT

A fiber optic frequency shifter comprises an optical fiber having an acoustic conducting medium for propagation of an acoustic signal. The acoustic medium is preferably shaped as a rod, and the acoustic signal propagates longitudinally down the rod. The optical fiber is wound around the rod with plural turns such that the axis of the fiber is at an angle relative to the wave fronts of the acoustic signal. As the acoustic signal propagates through the rod, it causes stress on the portions of the fiber in contact with the rod. The stress on the fiber caused by the acoustic wave causes optical energy to be transferred between two propagation mdes of the fiber. This transferred energy is shifted in frequency by the frequency of the acoustic signal. By tightly winding the turns of the fiber, high frequency shifts can be obtained. The invention is also advantageous in that it provides a large amount of acoustic contact between the acoustic wave fronts and the fiber over a relatively short acoustic propagation distance. Thus, the device is quite compact.

23 Claims, 4 Drawing Sheets

OTHER PUBLICATIONS

"Broadband Guided—Wave Optical Frequency Translator Using an Electro—Optical Bragg Array", Kingston et al., *Applied Physics Letters*, vol. 42, No. 9, 5/83, pp. 759–761.

"Studies for the Use of Gyrotropic and Anisotropic Materials", Wang et al., Journal of Applied Physics, vol. 43, No. 4, 4/72, p. 1862.

"Optical Fiber Acoustic Sensor Using Mode—Mode Interference", Layton et al., *Applied Optics*, vol. 18, No. 5, 3/79, pp. 666–670.

Acousto—Optic Frequency Shifter for Single Mode Fibers, Nosu et al., published at 47th Int'l. Conf. on Integrated Optics and Optical Fiber Communications in Tokyo, Jun. 27–30, 1983, and in Electronics Letters, vol. 19, #20 (Sep. 29, 83').

Acousto—Optic Frequency Shifting in Birefringent Fiber, W. P. Risk et al., Optics Letters, vol. 9, #7, Jul. 1984, pp. 309–311.

Single—Sideband Frequency Shifting in Birefringent Optical Fiber, W. P. Risk et al., SPIE, vol. 478, Fiber Optics and Laser Sensors II, May 1984, pp. 91–97.

Acousto—Optic Birefringent Fiber Frequency Shifters, W. P. Risk et al., Integrated and Guided Wave Optics Conference, sponsored by Quantum Electronics Group of IEEE, and by the Optical Society of American, Kissimmee, FL, Apr. 24–26, 1984.

Birefringent Fiber Polarization Coupler, R. C. Youngquist et al., Optics letters, vol. 8, No. 12, Dec. 1983, pp. 656–658.

Self Locating Elliptically Cored Fibre With an Accessible Guiding Region, R. B. Dyott et al., Electronics Letters, vol. 18, #22, Oct. 28, 1982, pp. 980–981.

Single Mode Fiber Optical Polarization Rotator, R. Ulrich et al., Applied Optics, vol. 8, #11, Jun. 1, 1979, pp. 1857–1861.

Two Mode Fiber Modal Coupler, R. C. Youngquist et al., Optics Letters, vol. 9, No. 5, May 1984, pp. 177–179.

Active Polarization Coupler for Birfringent Fiber, J. L. Brooks et al., Optics Letters, vol. 9, #6, Jun. 1984, pp. 249–251.

Single Sideband Frequency Shifting, R. C. Youngquist, Ph.d., Thesis: Loss and Periodic Coupling Effects in Dielectric Directional Couplers, Chapter 7, Jun. 1984.

Conical Transducer for Generation of Acoustic Waves in Fluids, R. L. Baer et al, Applied Physics Letter, vol. 42, No. 7, Apr. 1, 1983.

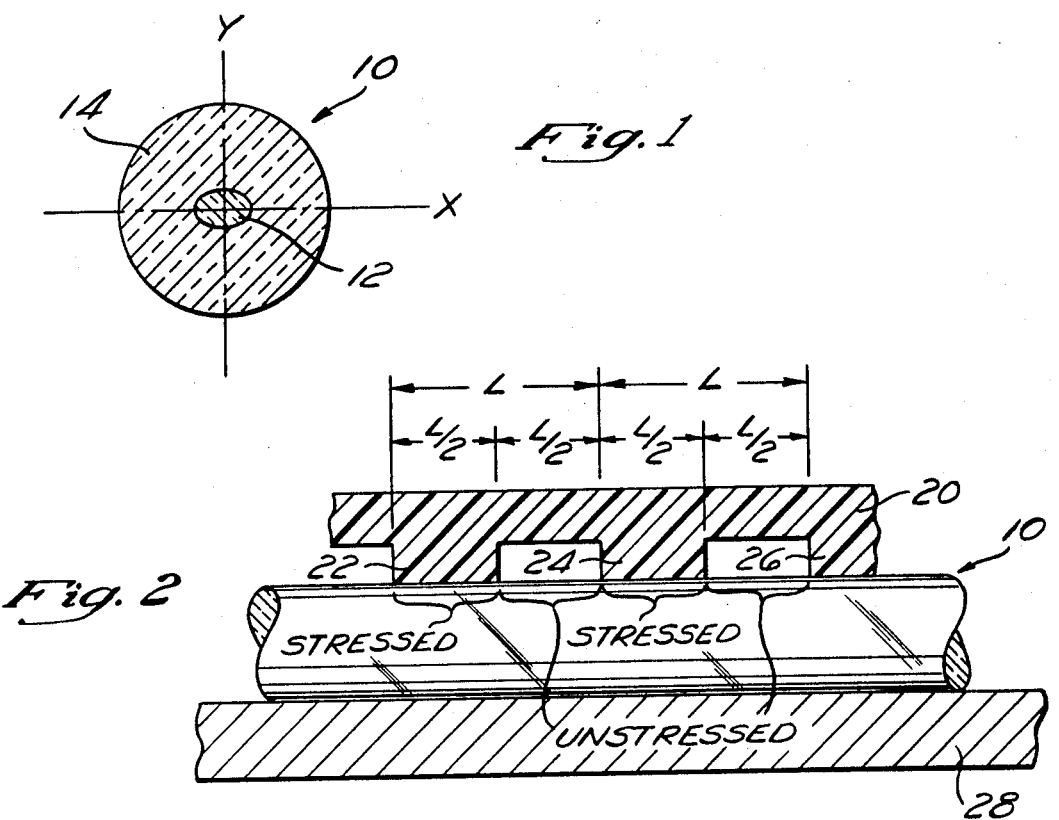
Fig. 1
Fig. 2
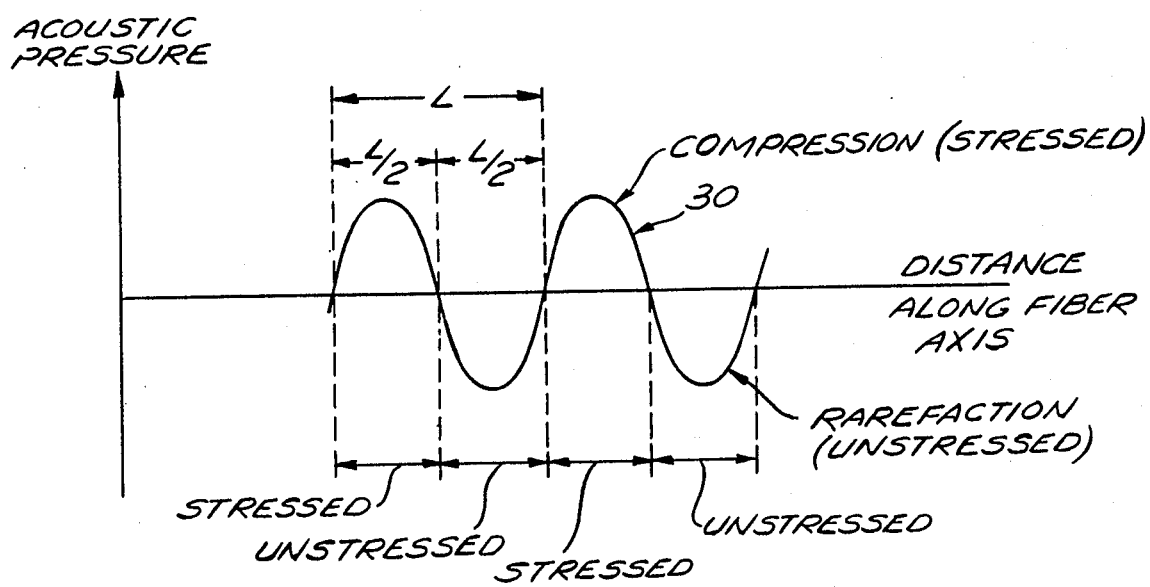
Fig. 3

ACOUSTO-OPTIC FREQUENCY SHIFTER UTILIZING MULTI-TURN OPTICAL FIBER

BACKGROUND OF THE INVENTION

The present invention relates to acousto-optic frequency shifters, and particularly to fiber optic frequency shifters utilizing surface acoustic waves or bulk acoustic waves.

Optical frequency shifting is typically based upon the Doppler effect, i.e., the change in frequency due to relative movement between the source and observer. The frequency becomes higher and the wavelength shorter when the source is moving towards the observer, and the frequency becomes lower and the wavelength higher when the source is moving away from the observer.

The Doppler effect has been used in bulk optics to cause frequency shifts in light waves reflected from wave fronts of acoustic waves propagating through optically transparent bulk media. The areas of compression and rarefaction caused by the traveling acoustic wave change the index of refraction in the bulk media so that the incoming light is reflected and/or refracted. Movement of the acoustic wave fronts causes a Doppler shift in the reflected and refracted light, such that the light is shifted in frequency by an amount equal to the frequency of the acoustic wave.

While bulk optic frequency shifters are well known, the development of fiber optic frequency shifters is in its infancy. Recently, a rudimentary fiber optic frequency shifter was disclosed by Nosu et al. in an article entitled "Acousto-Optic Frequency Shifter for Single Mode Fibers", published at the 47th International Conference on Integrated Optics and Optical Fiber Communications in Tokyo, June 27-30, 1983, and in *Electronics Letters*, Vol. 19, No. 20 (Sept. 29, 1983). A birefringent, single mode fiber was placed in piezoelectric (PZT) cylinders in an off-axis position. Each PZT cylinder was filled with mineral oil. A standing pressure wave in each cylinder resulted when the cylinders were excited with sinusoidal signals to cause elasto-optic coupling between the polarization modes of the fiber, thereby creating side bands above and below the optical carrier. Each cylinder generated one side band that was in phase and another that was out of phase with the side bands created by the other cylinder, such that one side band was strengthened and the other cancelled.

The Nosu device thus functions by applying pressure to the fiber at discrete intervals along the fiber, specifically at intervals of three-quarters beat length of the fiber. The maximum frequency shift obtainable with the Nosu device is equal to the maximum rate which the PZT cylinders can be practically driven. Further, the amount of power coupled between polarization modes at each coupling point—i.e., at each PZT cylinder—is quite small, and thus, to couple a significant amount of power a large number of these PZT cylinders would be required, yielding a quite unwieldy and generally impractical device for use in fiber optic systems.

As discussed in copending patent application Ser. No. 556,636, entitled "Single Mode Fiber Optic Single Side Band Modulator", by Shaw, Youngquist, and Brooks, filed on Nov. 30, 1983, now U.S. Pat. No. 4,684,215, and assigned to the assignee of the present application, an alternative approach to frequency shifting is to launch an actual acoustic wave (either a surface wave or bulk wave), for propagation longitudinally along the length of the optical fiber. This approach has the advantage of providing a continuous, virtually infinite, number of coupling points which travel along the length of the fiber, as opposed to the discrete static coupling points at spaced intervals of the Nosu device. Further, actual acoustic waves can be generated at a frequency which is higher than the PZT cylinders of Nosu can be driven, and thus, such actual acoustic wave devices are capable of greater amounts of frequency shift than the Nosu device.

One limitation on acousto-optic frequency shifters which utilize actual acoustic waves is that, for maximum coupling between modes, the acoustic wavelength should be equal to the fiber beat length. For present, commercially available high birefringence fibers, the minimum beat length is on the order of 1 mm. An acoustic wavelength of 1 mm corresponds to an acoustic frequency of about 1-5 MHz. Accordingly, there is a need in the art for a fiber optic frequency shifter which utilizes actual acoustic waves, but avoids this limitation such that the maximum possible frequency shift is not restricted by the beat length of the fiber.

In copending patent application Ser. No. 581,176, entitled "Acousto-Optic Frequency Shifter", by Shaw, Youngquist, Kino, and Risk, filed on Feb. 17, 1984, and assigned to the assignee of the instant application, a fiber optic frequency shifter is disclosed which positions an acoustic transducer relative to an optical fiber such that the wave fronts of the acoustic wave acoustically contact the fiber at an angle of incidence which is less than 90° and greater than 0°. The wavelength of the acoustic wave is substantially equal to the beat length of the optical fiber times the sine of the angle of incidence. Thus, the angle of incidence can be chosen such that the shorter wavelengths of high frequency acoustic waves can be matched with the beat length of the fiber. As a result, the maximum possible frequency shift can be substantially increased.

The present invention provides an improvement on the basic concept described in copending application Ser. No. 581,176 by providing a compact acousto-optic frequency shifter which achieves a large shift in the optical frequency while utilizing substantially all of the energy from the acoustic signal.

SUMMARY OF THE INVENTION

The present invention comprises an optical fiber and an acoustic conducting medium for propagation of an acoustic signal. In the preferred embodiment, the acoustic medium is shaped as a rod, and the acoustic signal propagates longitudinally down the rod. The optical fiber is wound around the rod with plural turns such that the central axis of the fiber is at an angle relative to the wave fronts of the acoustic signal. Hereafter, this angle is referred to as the "angle of incidence."

The optical fiber is placed in acoustic contact with the rod for at least a portion of each turn of the fiber, although it is preferable to provide continuous acoustic contact throughout the plural turns of the fiber. As the acoustic signal propagates through the rod, it causes stress on the portions of the fiber in contact with the rod. The angle of the fiber with respect to the wave fronts of the acoustic signal is chosen such that the wavelength of the acoustic signal is substantially equal to the beat length of an optical signal in the optical fiber times the sine of the angle of incidence.

The optical fiber has physical parameters selected to cause an optical signal propagating therein to propagate in one or both of two propagation modes. The propagation modes may comprise the two polarization modes of a single mode birefringent optical fiber or the first and second order modes of a non-birefringent optical fiber. When the optical signal passes through the portions of the optical fiber which are in acoustic contact with the acoustic wave propagated by the rod, the stress on the fiber caused by the acoustic wave causes optical energy to be transferred between the propagation modes of the fiber. The transferred energy is shifted in frequency by the frequency of the acoustic signal. Thus, the apparatus converts light of one frequency to light of a different frequency.

The acoustic wave may comprise either a bulk wave or a surface wave. A bulk acoustic wave traveling through the rod or a surface acoustic wave traveling on the rod causes undulations of the surface of the rod which acoustically contact the fiber and cause time-varying stresses in the fiber at each point of acoustic contact. Viewed another way, a particular point of stress may be considered as non-time varying but traveling down the fiber with a propagation phase velocity dependent on the angle of incidence. The stresses cause energy to be transferred between the two modes of propagation of the optical signal. For a given propagation distance of the acoustic wave, the multiple turns of fiber result in a substantially greater amount of energy transferred than would be transferred if the acoustic wave were to propagate along a single straight fiber.

In the preferred embodiment, the fiber is wound on the acoustic medium such that the angle of incidence of the acoustic wave with the optical fiber is constant. With a constant angle of incidence, the acousto-optic frequency shifter is responsive to a relatively narrow range of acoustic frequencies. In alternative embodiments of the invention, the angle of incidence of the acoustic wave on the optical fiber can be varied by winding different portions of the fiber at different pitches relative to the direction of propagation of the acoustic wave. Thus, portions of the optical fiber can be made responsive to different acoustic frequencies. The winding pitch can be made linearly variable to provide a broadband frequency shifter. In other embodiments, the winding pitch can be varied at discrete intervals to provide a frequency shifter responsive to discrete acoustic frequencies.

BRIEF DESCRIPTION OF THE DRAWINGS

These and other features of the present invention may best be understood through reference to the drawings in which:

FIG. 1 is a cross sectional view illustrating the two orthogonal axes of birefringence of a single mode high birefringence fiber;

FIG. 2 is an elevation view in partial cross section which schematically shows a polarization coupler comprising a ridge structure for creating alternate stressed and unstressed regions in an optical fiber to cause coupling between the polarization modes of such optical fiber;

FIG. 3 is a graph of acoustic pressure verses the distance along the axis of an optical fiber, illustrating regions of compression and rarefaction caused by the wave front of a traveling acoustic wave which provide corresponding stressed and unstressed regions in the optical fiber;

DETAILED DESCRIPTION OF THE PREFERRED EMBODIMENT

Figure 4:
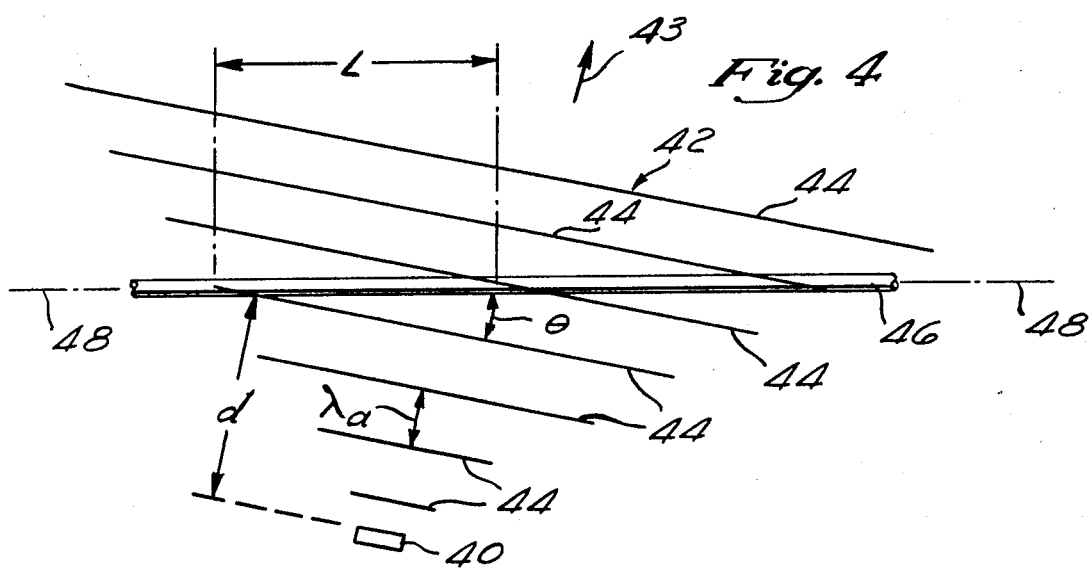
FIG. 4 is a schematic diagram of an optical fiber and an acoustic transducer, showing the acoustic wave fronts generated by such transducer directed to acoustically contact the fiber at an angle thereto, and illustrating that, for proper phase matching of the acoustic wave to the beat pattern of the fiber, the angle should be selected such that the distance between adjacent wave fronts as measured along the fiber is equal to the beat length of the fiber.

The theory of operation of the present invention will be presented initially, followed by a description of the physical structure of the embodiments of the present invention. Additional information regarding the theory of frequency shifting in birefringent optical fibers can be found in "Acousto-optic Frequency Shifting in Birefringent Fiber," W. P. Risk, et al, *OPTICS LETTERS*, Vol. 9, No. 7, July, 1984, pp. 309–311; "Single-Sideband Frequency Shifting in Birefringent Optical Fiber." W. P. Risk, et al, *SPIE*, Vol. 478, *FIBER OPTICS AND LASER SENSORS II*, May, 1984, pp. 91–97; and "Acousto-Optic Birefringent Fiber Frequency Shifters," W. P. Risk, et al, *Integrated and Guided Wave Optics Conference*, sponsored by the Quantum Electronics Group of IEEE and by the Optical Society of America, Kissimmee, Fla. (Apr. 24-26, 1984).

The frequency shifter of the present invention utilizes a birefringent single mode optical fiber 10, having a central core 12 of relatively high index of refraction and a surrounding cladding 14 of relatively low index of refraction, as shown in FIG. 1. As is well known, a birefringent fiber has two orthogonal principle axes of birefringence, each of which corresponds to a polarization mode or optical path through the fiber. These axes are labelled X and Y in FIG. 1. Light which is linearly polarized along either of these two axes will remain linearly polarized as it propagates down the fiber. In general, light of any polarization can be regarded as a superposition of these two linearly polarized modes.

The two polarization modes of birefringent single mode optical fiber propagate light at slightly different velocities. Therefore, the phase of light in the X-axis mode will change relative to that in the Y-axis mode as the light propagates down the fiber. The distance, measured longitudinally along the fiber, required for light in one mode to separate in phase by 360° relative to light in the other mode is commonly referred to as the "beat length" of the fiber. Mathematically, the beat length may be defined as follows:

$$L = \lambda / \Delta n \quad (1)$$

where L is the beat length, $\lambda$ is the wave length of the light, and $\Delta n$ is the difference in index of refraction for the two polarization modes.

From equation 1 it may be seen that the beat length is inversely proportional to the difference in index of refraction between the modes, and thus, is inversely proportional to the birefringence of the fiber. Consequently, high birefringence fibers have shorter beat lengths than low birefringence fibers. The fiber 10 of the preferred embodiment is a high birefringence fiber having a beat length on the order of 1 mm. One common technique for fabricating high birefringence fibers is to draw the fiber such that the core has an elliptical shape, as illustrated by the core 12 in FIG. 1.

High birefringence fibers are advantageous in that the polarization modes are well defined, and thus the polarization of the applied light will be maintained over relatively long lengths of fiber, without significant coupling of light between the polarization modes. Thus, the polarization modes of a high birefringence fiber may be viewed as independent optical paths through the fiber, which are normally uncoupled such that light is not transferred between them.

As discussed in co-pending U.S. patent application, Ser. No. 556,305, filed Nov. 30, 1983 entitled "Birefringent Fiber Narrowband Polarization Coupler", co-pending U.S. patent application Ser. No. 556,636, filed Nov. 30, 1983, entitled "Single Mode Fiber Optic Single Sideband Modulator", now U.S. Pat. No. 4,684,215, and an article entitled "Birefringent Fiber Polarization Coupler", *Optics Letters*, Volume 8, No. 12 (December 1983), pages 656-658, selective coupling of light between the polarization modes of a birefringent single mode fiber may be achieved by applying a force to the birefringent fiber at an angle of about 45° relative to the principle axes of birefringence. Such force may be applied by squeezing the fiber between two anvils or plates on opposing sides of the fiber. Application of such force perturbs the axes of birefringence at the point of force, and causes the axes of birefringence to be rotated through a small angle. Consequently, when light launched in one linearly polarized mode reaches the localized perturbation, the light will decompose into a superposition of modes linearly polarized along the perturbed axes of birefringence, effectively coupling light from one polarization mode to the other. The coupled light is not frequency shifted because the stresses in the fiber are static, and do not travel down the fiber.

The foregoing may be more fully understood through reference to FIG. 2 which schematically depicts a ridge structure 20 comprising plural ridges 22, 24, 26 at spaced intervals. The fiber 10 is disposed between the ridges 22, 24, 26 and a base block 28, so that the fiber 10 may be squeezed therebetween. Application of force to the ridge structure 20 in a direction normal to the axes of the fiber 10 perturb the axes of birefringence at each of the ridges 22, 24, 26 and provides alternate stressed and unstressed regions along the fiber 10 which cause coupling between the two polarization modes of the fiber 10. For maximum coupling between the modes, it is preferable that the ridges 22, 24, 26 be spaced at beat length intervals and that the length of each ridge be one half beat length. Satisfying these conditions causes the coupling at each ridge 22, 24, 26 to be cumulative with the coupling at the other ridges 22, 24, 26. By providing a sufficient number of ridges 22, 24, 26, one hundred percent of light input to one of the polarization modes can be coupled to the other of the polarization modes. A more complete description of this coupling phenomenon may be found in the above referenced article and patent applications, which are hereby incorporated by reference herein.

The alternate stressed and unstressed regions provided by the ridge structure 20 of FIG. 2 may be alternatively provided by an actual traveling acoustic wave, such as the acoustic wave 30 of FIG. 3, which is launched to propagate longitudinally along the central axis of the fiber 10. The periodicity of the traveling acoustic wave 30 provides alternating regions of compression and rarefaction so as to provide corresponding alternating stressed and unstressed regions in the fiber, and thus, cause coupling between the polarization modes of the fiber. For maximum coupling, it is preferable that the wavelength of the acoustic wave 30 be selected such that it is equal to the beat length of the fiber. Since the acoustic wave is sinusoidal, each of the alternating regions of compression and rarefaction will then be one-half beat length in length, and thus, each of the alternating stressed and unstressed regions will also be one-half beat length in length. From the foregoing, it will be understood that the acoustic wave 30 of FIG. 3, by providing alternating half beat length stressed and unstressed regions along the fiber, cumulatively couples light between the polarization modes of the fiber in much the same manner as the half beat length ridges 22, 24, 26 of FIG. 2. In addition, it should be understood that, while an acoustic wavelength which is equal to the fiber beat length is preferred for maximum coupling, cumulative coupling will also occur if the wavelength is an odd multiple of beat lengths.

In contrast to the ridged structure 20 of FIG. 2 in which the fiber stresses produced by the ridges 22, 24, 26 are static, the fiber stress pattern produced by the traveling acoustic wave 30 of FIG. 3 travels down the fiber. Such travel of the stress pattern causes the light coupled from one polarization mode to the other to be shifted in frequency much as light from a moving source is Doppler shifted. In effect, the optical carrier wave and the acoustic wave are heterodyned such that the acoustic frequency and the optical carrier frequency combine both additively and subtractively to provide side bands at the sum and difference frequencies. If the acoustic wave propagates in the same direction as the light, light coupled from the faster polarization mode to the slower polarization mode is upshifted in frequency, while light propagating from the slower polarization mode to the faster polarization mode is downshifted in frequency. If the acoustic wave propagates in a direction opposite to that of the optical carrier, these relationships are reversed, so that light coupled from the faster mode to the slower mode is downshifted, while light coupled from the slower mode to the faster mode is upshifted.

Frequency shifted coupling requires that the acoustic wave be properly phased matched to the beat pattern of the optical modes in the fiber. In FIG. 3, such phase matching occurs when the acoustic wavelength, as measured along the axis of the fiber (rather than the direction of propagation of the acoustic wave), is equal to the beat length of the fiber. Stated differently, the propagation constant of the faster mode (lower index), the slower mode (higher index), and the acoustic wave should satisfy the following relationship:

$$k_1 + k_a = k_2 \quad (2)$$

where $k_1$ is the propagation constant of the faster mode; $k_2$ is the propagation constant of the slower mode; and $k_a$ is the component of the acoustic propagation constant along the fiber.

The frequency shifted coupling of light between the polarization modes may be examined mathematically by representing the light in the fast optical mode as $\cos(\omega t - k_1 z)$, where $\omega$ is the angular frequency of the light, t is time, and z is the distance along the fiber axis. The acoustic wave may be represented as $\cos(\omega_a t - k_a z)$, where $\omega_a$ is the angular frequency of the acoustic wave. The interaction of these two waves leads to a product term proportional to:

$$\tfrac{1}{2}\{\cos[(\omega+\omega_a)t - (k_1+k_a)Z] + \cos[(\omega-\omega_a)t - (k_1-k_a)Z]\} \quad (3)$$

The second term of Expression 3 does not satisfy the phase matching condition of Equation 2, and thus, it is expected that the signal represented by this term will die away. The first term, however, is phase matched to the slow mode, in accordance with expression (2), and explicitly indicates that the slow mode is upshifted. A similar analysis shows that if the slow mode interacts with the acoustic wave, the expression for the resulting interaction is:

$$\tfrac{1}{2}\{\cos[(\omega-\omega_a)t - (k_2-k_a)Z] + \cos[(\omega+\omega_a)t - (k_2+k_a)Z]\} \quad (4)$$

The second term of Expression 4, like the second term of Expression 3, is not phased matched, however, the remaining term is phased matched to the fast mode, in accordance with equation (2) and explicitly describes a downshifted wave.

Thus, from the foregoing analysis, it may be seen that the upper side band will be contained in one polarization, and the lower side band will be contained in the other. The desired side band can be selected by passing the output light through a polarizer.

The foregoing phase matching requirements indicate that, for an acoustic wave propagating longitudinally down the fiber with the wave fronts normal to the fiber axis, the acoustic wave frequency should be such that its wavelength is equal to the fiber beat length. Since fiber beat lengths are typically on the order 1 mm or more, the maximum available frequency shift from such longitudinally propagating acoustic wave is on the order of only a few megahertz.

Figure 5:
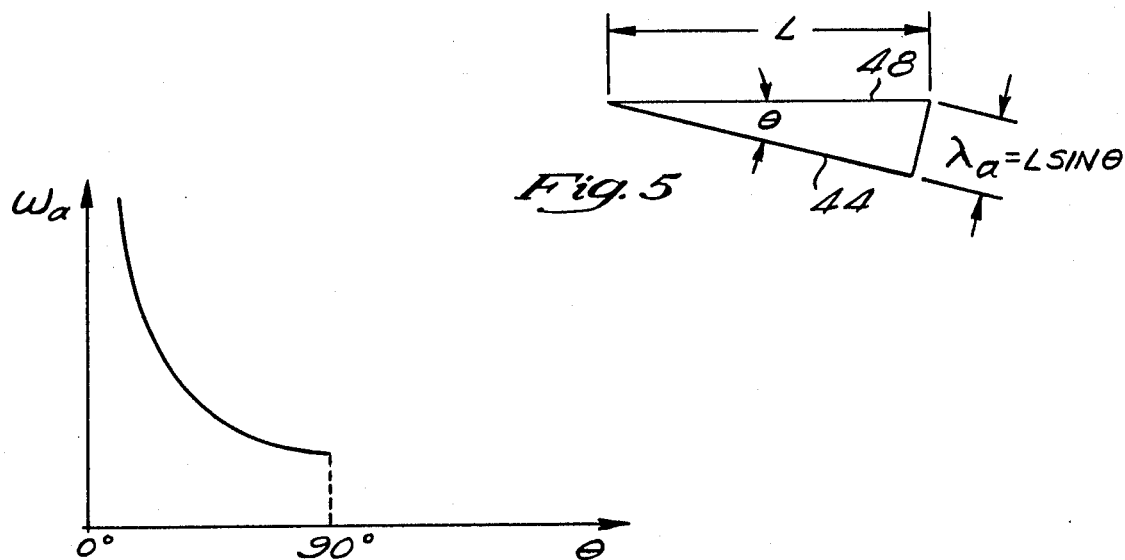
FIG. 5 is a diagram showing the relationship between the angle of incidence, beat length, and acoustic wavelength required for proper phase matching of the acoustic wave to the beat pattern of the fiber.

FIG. 4 illustrates a frequency shifter which circumvents this limitation by positioning an acoustic transducer 40 to produce an acoustic wave 42, which propagates in a direction, e.g., as indicated by the arrow 43, which is at an angle to the central axis 48 of a high birefringence single mode optical fiber 46. Such positioning causes the wave fronts 44 of the wave 42 to be directed to acoustically contact the highly birefringent single mode optical fiber 46 at an angle $\theta$, referred to herein as "the angle of incidence." As used herein, the term "angle of incidence is defined as the acute angle between a wave front of an acoustic wave impinging on the fiber and the longitudinal central axis 48 of that fiber. The wavelength $\lambda_a$ (which is measured in the direction of propagation 43) of the acoustic wave 44 and the angle of incidence, $\theta$, are preferably selected such that adjacent wave fronts 44 are spaced by one fiber beat length, L, which is measured in a direction along the fiber axis 48. This beat length spacing of the wave fronts 44 satisfies the phase matching conditions set forth above, and thus, the component of acoustic propagation along the fiber axis 48 will satisfy Equation 2, above. This arrangement permits the use of much shorter acoustic wavelengths, and thus, much higher acoustic frequencies than with a longitudinally propagating acoustic wave, while still satisfying the phase matching condition. As illustrated in FIG. 5, simple trigonometry shows that the phase matching condition will be satisfied when:

$$\lambda_a = L \sin \theta \quad (5)$$

Accordingly, by varying the angle of incidence, $\theta$, the acoustic wavelength, and thus, the acoustic frequency may be readily changed. Equation 5 may be rewritten in terms of the acoustic frequency $\omega_a$, as follows:

$$\omega_a = \frac{2\pi V_a}{L \sin \theta} \quad (6)$$

where $V_a$ is the propagation velocity of the acoustic wave in the direction 43.

Figure 6:
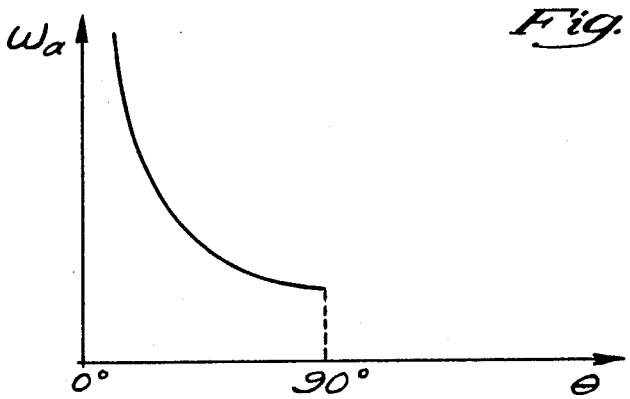
FIG. 6 is a graph of acoustic frequency as a function of the angle of incidence, illustrating that small angles of incidence permit the use of acoustic frequencies which are quite high, and yield correspondingly high frequency shifts.

FIG. 6 graphically illustrates the relationship between the acoustic frequency and the angle of incidence, and shows that for very small angles of incidence (e.g., a few degrees or a fraction of a degree), the acoustic frequency utilized may be quite high. Note that the acoustic frequency is at a minimum when $\theta$ equals 90° (i.e., when the acoustic wave fronts are normal to the fiber). By way of example, an angle of incidence of 3° would permit use of an acoustic frequency of 95 MHz for a fiber having a 1 mm beat length.

The device of FIG. 4 may also be analyzed in terms of the "propagation phase velocity" of the acoustic wave. The term "propagation phase velocity," as used herein, is defined as the velocity, measured along a particular line of measurement (e.g., the direction 43 or axis 48), with which the intersecion of a wave front (e.g., one of the wave fronts 44) and that axis of measurement move. Thus, for a particular wave front 44, that wave front will have a "propagation phase velocity" which is peculiar to the axis of measurement which is selected. The propagation phase velocity along the line 43 is equal to the rate at which the wave front moves along that line. Similarly, the propagation phase velocity along the fiber axis 48 is the rate at which the wave front moves along that axis. The propagation phase velocity of the acoustic wave in the direction of propagation 43 is independent of the angle of incidence. However, the propagation phase velocity of the acoustic wave fronts in the direction of the fiber axis 48 increases as the angle of incidence decreases and decreases as the angle of incidence increases. Thus, by directing the wave 42 at an angle relative to the fiber 46, the propagation phase velocity of the wave fronts 44 will be higher in the direction along the fiber axis 48 than along the direction of propagation 43. In general, for a given acoustic propagation velocity and frequency, the closer the angle of incidence is to 0°, the higher the propagation phase velocity along the fiber axis. Further, the higher the propagation phase velocity, the higher the acoustic frequency can be, while still maintaining the proper phase matching conditions. Thus, directing the acoustic wave at an angle to the fiber increases the propagation phase velocity in the direction of the fiber axis and thereby permits a high frequency acoustic signal to be matched with a fiber having a relatively long beat length.

The present invention relies on the above described theory of operation by directing the acoustic wave at an angle to the fiber to provide high propagation phase velocities relative for the wave fronts along the fiber axis, and thus, achieve high frequency shifts. The invention also utilizes a novel multi-turn fiber structure to increase the efficiency of the energy transfers between modes without requiring an increase in the acoustic energy.

Figure 7:
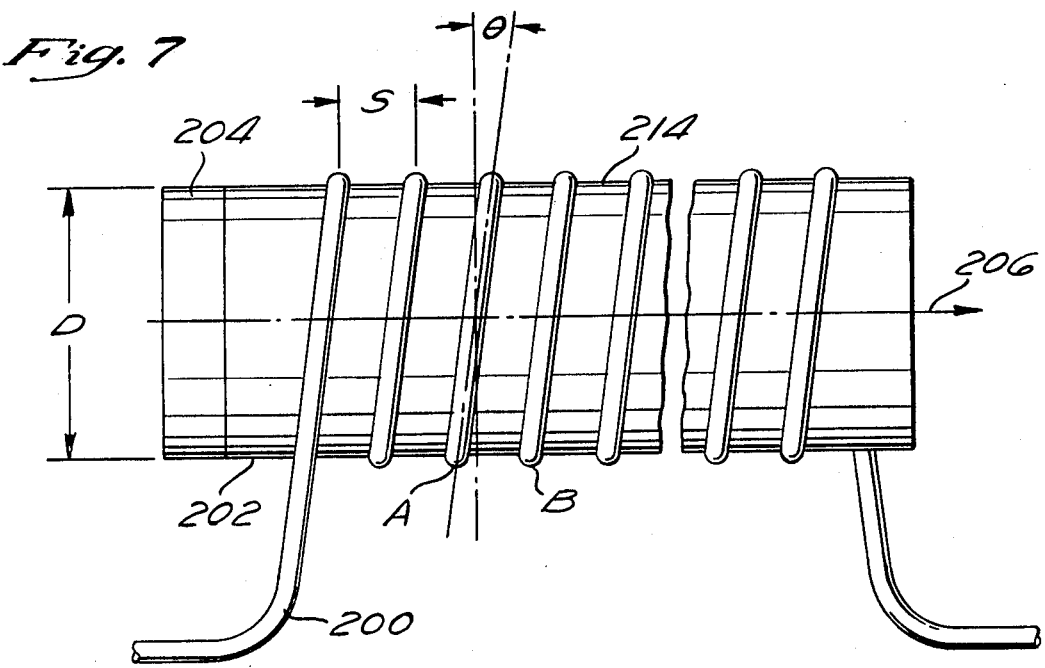
FIG. 7 is a side elevational view of the preferred embodiment of the present invention showing a solid cylindrical rod with a fiber helically wound thereon at a constant pitch, and a bulk wave transducer at one end of the rod for generating a bulk acoustic wave which travels longitudinally down the rod.

FIG. 7 illustrates a preferred embodiment of the present invention. A birefringent fiber 200 is helically wound around the surface 214 of an acoustic-conducting medium 202, at a constant pitch angle $\theta$ such that the fiber is in continuous acoustic contact with the surface 214 through plural turns spaced apart by a pitch distance S. The "pitch angle" is the angle of the fiber 200 with respect to a plane normal to the longitudinal axis of the acoustic-conducting medium 202, and, as will be explained below, is equal to the angle of incidence of an acoustic surface wave on the fiber 200. In this preferred embodiment, the acoustic-conducting medium 202 is a solid rod having a circular cross section having a diameter D. The rod is preferably a right circular cylinder (i.e., it has a uniform diameter). By way of example, the rod 202 may be formed of silica glass. Preferably, the fiber 200 is wound on the rod 202 with a small amount of tension applied to the fiber 200 to provide good acoustic contact between the fiber 200 and the rod 202. The fiber 200 advantageously can be affixed to the rod 202 by means of a bonding substance such as epoxy glue (not shown), or other means known to the art. Preferably, the tension applied to the fiber 200 is maintained while the glue is curing.

A bulk wave transducer 204 is attached to one end of the rod 202 and is activated by a source (not shown) of high frequency oscillating voltage to generate a bulk acoustic wave which propagates in the direction indicated by the arrow 206. In the embodiment shown, the direction 206 is coincident with the longitudinal axis of the rod 202.

Figure 8:
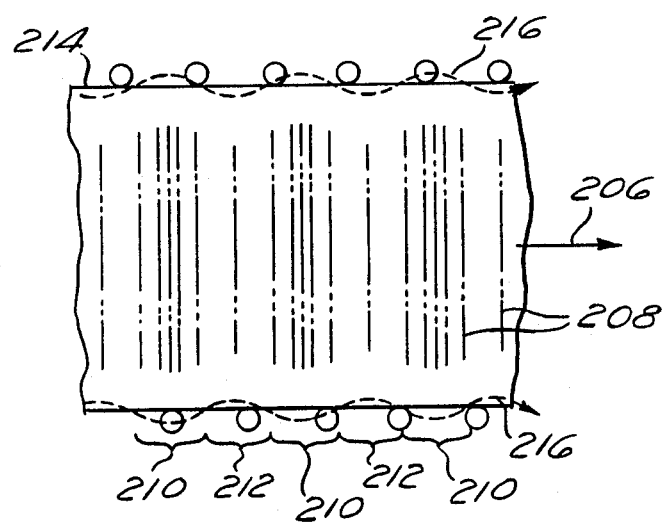
FIG. 8 is a schematic partial cross-sectional view of the solid rod of FIG. 7 which pictorially illustrates the effect on the surface of the rod caused by the regions of rarefaction and compression of a bulk acoustic wave.

The bulk transducer 204 can be a PZT (lead zirconium titanate) disk, which typically operates in the frequency range from 1 to 20 MHz; a lithium niobate (LiNbO$_2$) disk, which typically operates in the frequency range from less than 1 MHz to greater than 1 GHz; a zinc oxide disk, which typically operates in the frequency range from 100 MHz to greater than 1 GHz; or other transducers known to the art. When an oscillating electric signal is applied to the piezoelectric transducer 204, it expands and contracts in the direction of the longitudinal axis of the rod 202 to generate the bulk acoustic wave. The bulk acoustic wave traveling through the solid rod 202 in the direction indicated by the arrow 206 causes spatially periodic compressions and rarefactions of the rod 202. As will be recognized by those skilled in the art, the spatially periodic compressions and rarefactions in the rod cause undulations of the surface of the rod 202. This effect is illustrated in FIG. 8, for a short segment of the rod 202. The regions of compression and rarefaction are pictorially represented by the phantom lines 208, wherein compression is represented by closely spaced lines 208 in regions 210 and rarefaction is represented by widely spaced lines 208 in regions 212. The regions of compression 210 cause expansion of the surfaces 214 of the rod 202, while the regions of rarefaction 212 cause contractions of the surfaces 214 of the rod 202. The alternating expansions and contractions of the surface 214 of the rod 202 cause undulations, represented as exaggerated surface waves 216, which travel along the surface 214 of the rod 202 in the direction of the arrow 206. The undulations of the surface 214 of the rod 202 cause periodic stresses on the fiber 200 which is wound in acoustic contact with the surface 214 of the rod 202. The stresses affect the fiber in the manner described above in connection with FIG. 4.

The undulations caused by the acoustic wave propagating in the direction indicated by the arrow 206 sequentially stress each turn of the fiber 200. Thus, by winding the fiber 200 as a plurality of closely spaced turns around the rod 202, the acoustic wave fronts can affect a substantial length of the fiber 200 while traveling a relatively short distance between turns. Returning again to FIG. 7, a location A represents an arbitrary location on the rod 202 and the fiber 200 which can be considered to be the beginning of one turn of the fiber 200. A locaton B is chosen to be the location on the fiber 200 and the rod 202 one turn further along on the fiber 200 and thus spaced apart from the location A, in the direction indicated by the arrow 206, by the pitch distance S. An acoustic wave front traveling from the location A to the location B along the acoustic path provided by the rod 202 will travel the pitch distance S and will irradiate the length of one turn of the fiber 200 between the location A and the location B. Thus, the length of the optical path, measured along the fiber axis, between the location A and the location B, is substantially longer than the acoustic path, measured axially along the rod in the direction of acoustic propagation, between the location A and the location B. The wave front will then irradiate a turn of the fiber 200 beginning at location B, followed by subsequent turns of the fiber 200 as the wave front propagates in the direction indicated by the arrow 206. Thus, each portion of each wave front causes stress on a portion of each of a plurality of turns, thereby providing a cummulative transfer of optical signal energy between the two propagation modes. The present invention is particularly advantageous in providing a relatively large amount of acoustic contact between the fiber 200 and the propagating acoustic wave fronts over a relatively short acoustic propagation distance. Thus, the device can be quite compact. Furthermore, the acoustic rod provides an accoustic channel to constrain the acoustic wave fronts to a predetermined acoustic path.

Figure 9:
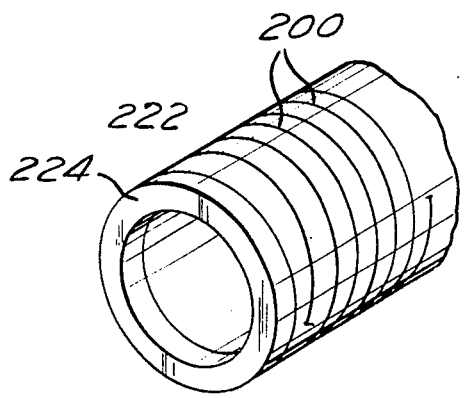
FIG. 9 is a partial perspective view of an alternative embodiment of the device shown in FIG. 7 in which the rod is hollow and in which the transducer is a radially-poled piezoelectric device which generates surface acoustic waves in the rod.

In another preferred embodiment of the invention, the rod is formed as a hollow tube, as illustrated in FIG. 9 for a rod 222. The fiber 200 is wrapped around the hollow rod 222 in the same manner as discussed above in reference to the solid rod 202 of FIG. 7. The hollow rod 222 has a transducer 224, mounted on one end for generating an acoustic wave. The transducer 224 may be of a bulk wave type, such as discussed in reference to FIG. 7. The hollow rod 222 is quite advantageous in that the bulk acoustic waves generated by the transducer 224 will propagate in the tubular wall of the hollow rod 222, so that the acoustic energy will be more concentrated than if the wave were propagating through the mass of the solid rod 202 (FIG. 7). It is believed that the hollow rod embodiment of FIG. 9 causes a larger percentage of the energy of the bulk acoustic waves to be transferred to the surface undulations which stress the fiber 200. The transducer 224 can be washer-shaped as illustrated in FIG. 9 to match the shape of the hollow cylindrical rod 222, thus concentrating the electrical energy only on piezoelectric material in contact with the end of the rod 222.

Figure 10:
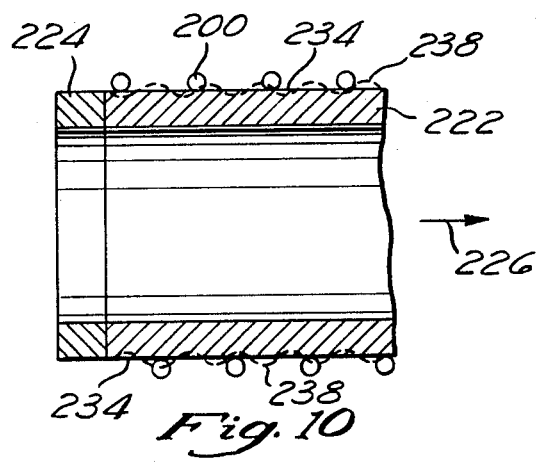
FIG. 10 is a partial cross-sectional view of the embodiment of FIG. 9 which illustrates the surface undulations of the surface acoustic wave generated by the radially-poled transducer.

In alternative embodiments of the devices shown in FIGS. 7 and 9, the transducers 204, 224 at the end of the rods 202, 222 may comprise edge-bonded transducers, or other means known to those skilled in the art, for generating surface acoustic waves directly. The use of a surface wave transducer is illustrated for the hollow, cylindrical rod 222 in a partial cross-sectional view in FIG. 10. By way of example, the transducer 224, attached to one end of the rod 222, may comprise a radially-poled, edge-bonded, surface wave transducer of piezoelectric material. As shown in the partial cross section in FIG. 10, the radially-poled transducer 224 generates undulations 238 in the surface 234 of the cylindrical rod 222 which propagate unidirectionally in the direction indicated by the arrow 226. Unlike the surface undulations caused by a bulk acoustic wave, the undulations in the surface 234 of the hollow cylindrical rod 222 in FIG. 10 are generated directly by the radially-poled, edge-bonded, transducer 224.

The construction and operation of radially-poled piezoelectric transducers is well known in the art. Briefly, such a transducer may be constructed from a thin, washer-shaped mass of PZT which is heated and then allowed to cool in the presence of a strong electric field. In this case, the electric field is symmetrical about the center of the PZT material. As is well known in the art, as the material cools, the PZT material is polarized in the direction of the field, i.e., radially. Thus, when an oscillating electric field (not shown) is applied to the PZT material, the material expands and contracts along its radii, thus periodically increasing and decreasing its diameter and circumference. In the embodiment of FIG. 10, the outer circumference (i.e., the edge) of the PZT transducer 224 is bonded to the outer circumference of the rod 222. Thus, the expansion and contraction of the transducer 224 induces undulations in the surface of the rod 222 which propagate in the direction indicated by arrow 226, as described above.

In the embodiments of the present invention, it is preferable to place an acoustic absorbing material (not shown), such as a black wax, at the end of the rods 202, 222 opposite the transducers 204, 224 to absorb the acoustic energy of the acoustic wave fronts after they have propagated the length of the rods. Thus, backward reflections of the acoustic wave fronts, caused by the discontinuities at the ends of the rods, are substantially reduced or eliminated.

Figure 11:
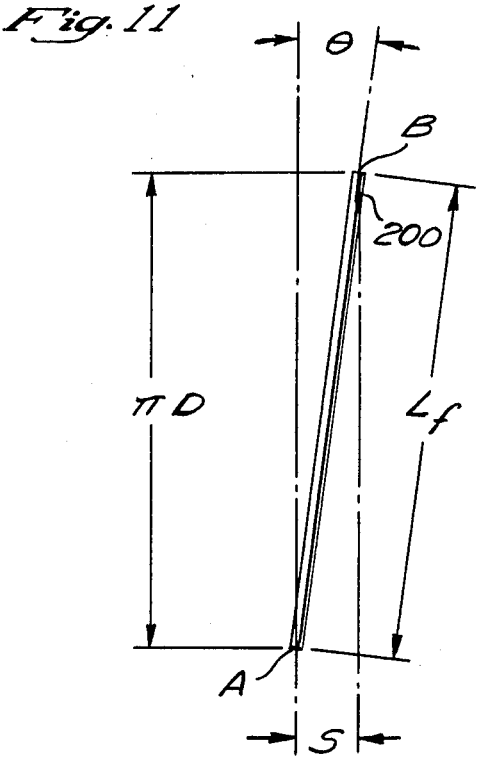
FIG. 11 is an illustration of one turn of the fiber of the embodiment of FIG. 7 showing the trigonometric relationships between the fiber and the rod.

The details of the operation of an acousto-optical frequency shifter constructed with either the solid cylindrical rod 202 or the hollow cylindrical rod 222 can be better understood by first referring to FIG. 11. FIG. 11 illustrates one turn of the fiber 200 of FIG. 7 with the fiber unwrapped from the rod 202 to show the trigonometric relationships between the dimensions. The locations A and B in FIG. 11 generally correspond to the locations A and B in FIG. 7 and represent the beginning and end of a one-turn length of the fiber 200. As shown in FIG. 7, each turn of the fiber advances down the rod 202 by the distance S which is referred to as the "pitch distance" of the turn. The length of fiber in each turn $L_f$ (FIG. 11) is determined by the pitch distance S and the diameter D of the rod 202. As illustrated in FIG. 11, the length $L_f$ forms the hypotenuse of a right triangle having sides of lengths S and $\pi D$, respectively. Thus, the length $L_f$ can be determined by the following equation:

$$L_f = \sqrt{(\pi D)^2 + S^2} \tag{7}$$

As best seen in FIG. 7, the fiber 200 forms an angle with a plane normal to the direction of propagation 206 of the acoustic wave, referred to herein as the "pitch angle" $\theta$. In the preferred embodiment, the pitch angle is also equal to the angle of incidence of the wave fronts of the surface acoustic wave on the fiber 200, and can be defined by the following expression:

$$\sin \theta = \frac{S}{L_f} = \frac{S}{\sqrt{(\pi D)^2 + S^2}} \tag{8}$$

It should be recalled from Equation 5, discussed in connection with FIG. 5, that proper phase matching will occur when:

$$\lambda_a = L \sin \theta \tag{5}$$

where L is the beat length of the fiber, and $\lambda_a$ is the acoustic wavelength. Thus, substituting Equation 8 into Equation 5, the acoustic wave length can be determined from the following equation:

$$\lambda_a = \frac{LS}{\sqrt{(\pi D)^2 + S^2}} \tag{9}$$

The acoustic frequency for proper phase matching can therefore be determined from the foregoing equation as follows:

$$f_a = \frac{V_a}{\lambda_a} = \frac{V_a \sqrt{(\pi D)^2 + S^2}}{LS} \tag{10}$$

where $f_a$ is the acoustic frequency; and $V_a$ is the velocity of the acoustic wave on the surface of the rod 202.

In an exemplary embodiment, the velocity of the acoustic wave may be approximately 6,000 meters per second; the diameter D of the rod 202 may be 12.7 mm (i.e., ≃0.5 inches); the pitch distance or spacing S may be 1.0 mm; and the beat length L may be 1.65 mm. These dimensions can be substituted into Equation 10 as follows:

$$f_a = \frac{6 \times 10^3 \frac{m}{sec} \times \sqrt{(\pi \times 12.7 \text{ mm})^2 + (1.0 \text{ mm})^2}}{1.65 \times \text{mm/cycle} \times 1.0 \text{ mm}} \quad (11)$$

$$= 145 \times 10^6 \text{ cycles/sec} = 145 \text{ MHz}$$

Thus, a 145 MHz acoustic signal can be propagated down the rod 202 to shift the frequency of an optical signal propagating in the fiber 200 by 145 MHz.

Assuming that the fiber 200 has a cladding diameter of 100 microns (i.e., 0.1 mm), the pitch S can be as small as 0.1 mm by winding the turns such that the cladding of adjacent turns is in contact. Substituting 0.1 mm for the value of S in equation 10 yields a theoretical maximum frequency of 1450 MHz for the embodiment described, subject to limitations of the acoustic bandwidth of the acoustic transducer and the rod. The frequency theoretically can be increased further by increasing the diameter of the rod 202 or by substituting a fiber 200 with a smaller diameter cladding. In any case, this device is capable of providing a frequency response significantly higher than heretofore possible.

The structural configuration of the present invention permits each wave front to irradiate long lengths of optical fiber over a relatively short acoustic propagation distance and thus efficently utilizes the acoustic energy. For example, the 145 MHz device described above can have 10 turns of fiber wrapped on a 10.0 mm length of the 12.7 mm diameter rod 202. Simple calculations show that approximately 399 mm of fiber can be wrapped on the rod 202 in this length. Thus, each acoustic wave front traveling a distance of 10.0 mm can irradiate approximately 399 mm of fiber.

Returning again to FIG. 7, the angle of incidence of the acoustic wave on the fiber 200 can be varied by varying the spacing S between turns of the fiber. Thus, different portions of the fiber on the rod 202 can be made responsive to different frequencies. For example, the pitch of the winding may be varied over a number of turns so that a sufficient length of fiber has the beat length substantially matched with each of the acoustic wave lengths in the range of the frequency shifter. In the preferred embodiment described above, each turn of fiber is approximately 24 beat lengths long (i.e., $\pi \times 12.7$ mm $\div 1.65$ mm). Thus, a substantial amount of energy is transferred between each of the propagation modes in each of the turns of the fiber.

Figure 12:
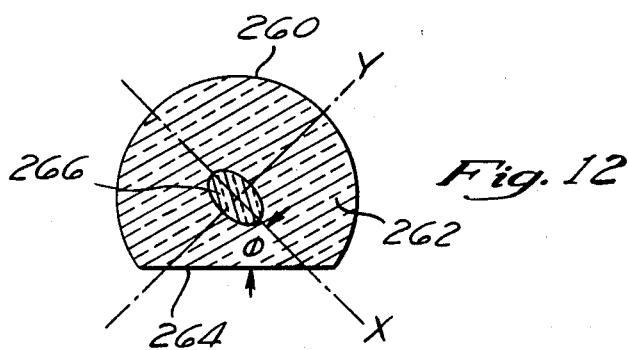
FIG. 12 is a cross-sectional view of a D-shaped fiber having an elliptical core as used in the preferred embodiments of this invention.

For maximum efficiency of the transfer of energy between the propagation modes of the fiber, it is preferable that the fiber 200 in FIG. 7 be a single mode birefringent fiber having two orthogonal polarization modes such as described above in connection with FIG. 1. This fiber has an elliptical core which is placed on the surface of the rod 202 with the principal axes of the core at an angle of approximately 45° with respect to the surface of the rod 202. Another type of fiber which is particularly advantageous for use in the present invention is a D-shaped cross section, as illustrated in FIG. 12. This D-shaped fiber is available from Andrew Corporation, 10500 W. 153rd St., Orland Park, Ill. 60462. As shown in FIG. 12, the cladding 262 of the D-shaped fiber 260 is not circular, but has a flat surface 264 on one side thereof. The fiber 260 also has an elliptical core 266 which is oriented in the cladding 242 with its major axis, X, at an angle $\phi$ with respect to the flat surface 264. Preferably, the angle $\phi$ is substantially equal to 45°. The use of the D-shaped fiber 260, illustrated in FIG. 12, greatly facilitates the manufacture of the present invention, since the D-shaped fiber 260 will naturally orient itself such that the flat surface 264 is in contact with the rod 202 of FIG. 7, thus properly positioning the principal axes of the core 266 with respect to the surface of the rod 202. A description of a D-shaped fiber can be found in R. B. Dyott, et al, "SELF-LOCATING ELLIPTICALLY CORED FIBRE WITH AN ACCESSIBLE GUIDING REGION," *ELECTRONICS LETTERS*, Vol. 18, No. 22, Oct. 28, 1982, pp. 980–981.

Figure 13:
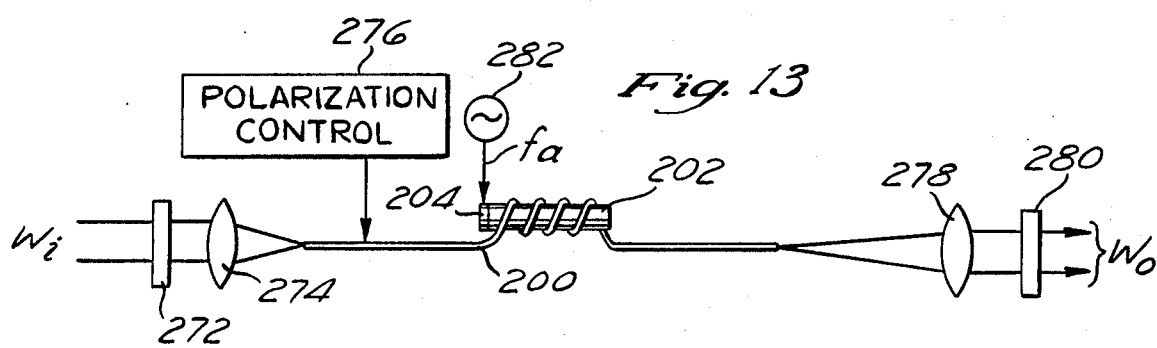
FIG. 13 is a schematic drawing showing an arrangement in which the frequency shifter of the present invention may be utilized as a single sideband modulator.

The above-described frequency shifter may be utilized to provide single side band modulated light. Referring to FIG. 13, an input light wave, $W_i$ is first passed through a modal filter, e.g., a polarizer 272, to ensure that the light is linearly polarized along one of the principal axes of birefringence of the fiber 200. A lens 274 is used to focus light from the polarizer 272 for introduction into the end of the fiber 200. The fiber 200 is wound on the rod 202 as described in connection with FIG. 7. Since the winding of the fiber 200 on the rod 202 may yield some static stress in the fiber which may perturb the axes of birefringence, it may be desirable to include a polarization controller 276 at the input end of the fiber 200 to permit final adjustment of the polarization to compensate for any such perturbation of the axis of birefringence. One type of birefringent single mode fiber polarization controller, which is suitable for use with the present invention, is described in an article by R. Ulrich and M. Johnson entitled "Single Mode Fiber Optical Polarization Rotator", *Applied Optics*, Vol. 8, No. 11, (June 1, 1979), pp. 1857–1861.

The transducer 204 on the end of the rod 202, is driven by a source 282 of an oscillating electric signal of frequency $f_a$ to produce acoustic waves in the rod 202. As the light wave propagates through the windings of the fiber 200 around the rod 202, the acoustic waves cause it to be at least partially coupled from the mode to which it was input, to the orthogonal mode, and such coupled light is shifted in frequency by an amount equal to the acoustic frequency, $f_a$, in accordance with the discussion in reference to FIGS. 3–11. As indicated previously, the direction of frequency shift (i.e., upshift or downshift) is determined not only by whether light is input to the fast mode or slow mode, but also the direction of acoustic wave propagation.

The light exiting the fiber 200 will contain frequency shifted light in one mode, and, if the input light was not 100% coupled, non-shifted light in the other mode. The light is then passed through a lens 278, for collimation purposes, and then through a modal filter, e.g., polarizer 280, oriented to block the non-shifted light in the original input mode, so that only the shifted light is passed by the polarizer 280 to form an output wave, $W_o$. Although the drawing of FIG. 13 shows bulk optic polarizers, those skilled in the art will understand that in-line fiber optic polarizers, such as described in U.S. Pat. No. 4,386,822 may be advantageous for many applications.

Figure 14:
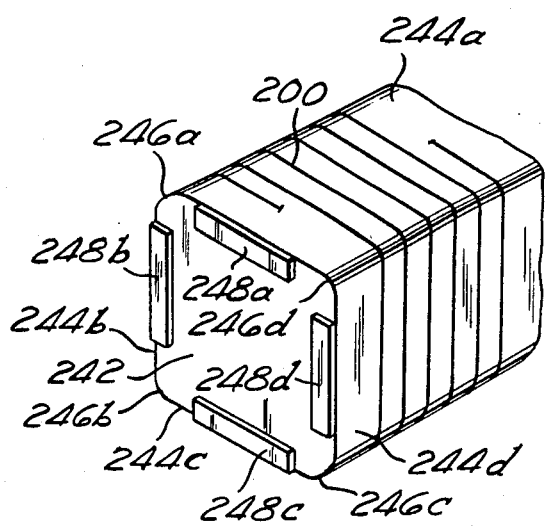
FIG. 14 is a perspective view of an alternative embodiment of the invention which incorporates a rectangular rod and a plurality of edge-bonded transducers.

Although the invention was described above in connection with a cylindrical rod, other rods having different cross sections can be utilized. For example, FIG. 14 illustrates the fiber 200 wrapped on a rod 242 having a generally square cross section so as to provide four flat surfaces 244a, 244b, 244c, 244d. One skilled in the art will recognize that the rod 242 will advantageously have curved corners 246a, 246b, 246c, 246d, in order to avoid sharp bends in the fiber 200 when wrapped on the rod 242. The radius of curvature of the corners 246a-d, is chosen such that light in the fiber 200 wrapped on the rod 242 will remain well-guided around the corners. The rectangular cross section for the rod 242 in FIG. 14 has the particular advantage that simple edge-bonded transducers 248a, 248b, 248c, 248d may be utilized to generate surface acoustic waves on each of the flat surfaces 244a-d. Furthermore, the transducers 248a-d can be driven individually at different frequencies or amplitudes to vary the amount of energy transferred between the modes and the magnitude of the frequency shift. The pitch angles of the windings on each of the surfaces may be the same or they may be different; however, in either case the pitch angles should preferably be selected to match the desired acoustic frequencies.

The present invention can also be used as an acoustic detector, responsive to a selected frequency or range of frequencies, by using the described embodiments without the transducers. The rod or other acoustic conducting medium is placed in the path of an acoustic wave and oriented in the direction of the acoustic propagation. The frequency of a light signal propagating through the optical fiber wound on the rod will be frequency shifted by an acoustic wave of proper frequency. As indicated above, the frequency shifter of the present invention can be wound with varying pitch to be responsive to a range of acoustic frequencies.

By varying the orientation of the acoustic detector of the present invention, it can be used as an acoustic direction finder. A single acoustic detector will have its maximum response, i.e., the greatest amount of energy at the shifted frequency, when oriented in the direction of propagation of the acoustic wave. A plurality of acoustic detectors placed in orthogonal orientations can also be used as direction finders by comparing the relative magnitudes of the responses of each of the detectors and calculating the acoustic propagation direction which corresponds to the magnitudes.

Although all of the above embodiments have been described in terms of a birefringent single mode fiber in which frequency shifted light is coupled between the two polarization modes of such fiber, nonbirefringent fiber may alternatively be utilized in the present invention. In the case of nonbirefringent fiber, the fiber should be selected to support two modes, namely, the first and second order modes for the particular wavelength of light utilized. By phase matching the beat length between the first and second order modes to the acoustic wavelength, in the same manner as discussed for polarization modes in reference to FIGS. 4-11, frequency shifted light will be coupled between the two modes, i.e., from the first order mode to the second order mode. Such coupling is due to perturbation of the modes caused by the acoustic stresses as they travel down the fiber. A more detailed explanation of the theory for such modal coupling is discussed in copending patent application Ser. No. 556,306 filed Nov. 30, 1983, entitled "Fiber Optic Modal Coupler," now abandoned, and in an article, "Two-Mode Fiber Modal Coupler," R. C. Youngquist, et al, *OPTICS LETTERS*, Vol. 9, No. 5, May, 1984, pp. 177-179, which are hereby incorporated herein by reference. A nonbirefringent fiber may thus be alternatively utilized in a single side band modulator using the present invention. The input light should be launched exclusively in the second order mode of the fiber, and a modal filter, e.g., mode stripper (not shown), should be placed at the output end of the device to suppress the second order mode such that only frequency shifted light coupled to the first order mode is output from the device.

What is claimed is:

1. A fiber optic frequency shifter, comprising:
   means for generating an acoustic wave;
   a rod for propagating said acoustic wave; and
   an optical fiber having a central axis, said optical fiber including first and second propagation modes which propagate light at first and second velocities, respectively, said fiber having a predetermined beat length for said modes, said fiber wrapped on said rod to form a plurality of turns in acoustic contact with the surface of said rod so that said acoustic wave stresses said fiber through at least a portion of each of said turns at selected stress locations along said fiber which propagate along at least a portion of said fiber as said acoustic wave propagates through said rod, said acoustic wave having a predetermined wavelength selected in accordance with the predetermined beat length of said fiber, such that said propagating stress locations cause light propagating in said first mode to be coupled to said second mode and shifted in frequency.

2. A fiber optic frequency shifter, as defined in claim 1, wherein said turns of said fiber are oriented on the surface of said rod such that each said portion of the fiber is at an angle of incidence with respect to the wave fronts of the acoustic wave which is greater than 0° and less than 90°, the wave length of said acoustic wave substantially equal to said beat length of said fiber times the sine of the angle of incidence of at least one of said portions.

3. A fiber optic frequency shifter, as defined by claim 1, wherein said fiber is a birefringent single-mode fiber, and said modes are the two orthogonal polarization modes of said birefringent single-mode fiber.

4. A fiber optic frequency shifter, as defined by claim 3, wherein said fiber has a core surrounded by a cladding, said cladding having a flat portion oriented at a predetermined angle with respect to the axes of birefringence of said fiber, said flat portion in acoustic contact with said rod.

5. A fiber optic frequency shifter, as defined in claim 1, wherein said means for generating said acoustic wave comprises an acoustic transducer.

6. A fiber optic frequency shifter, as defined in claim 1, wherein said rod is cylindrical.

7. A fiber optic frequency shifter, as defined in claim 1, wherein said fiber is helically wound on said rod.

8. A fiber optic frequency shifter, as defined in claim 7 wherein the spacing between said turns is constant.

9. A fiber optic frequency shifter, as defined in claim 7, wherein the spacing between said turns differs over a number of said turns.

10. A fiber optic frequency shifter, as defined in claim 1, wherein said frequency shift of said light is equal to the frequency of said acoustic wave.

11. A fiber optic frequency shifter, as defined in claim 1, wherein said fiber is in substantially continuous acoustic contact with the surface of said rod throughout said plurality of turns.

12. A fiber optic frequency shifter, comprising:
means for generating an acoustic wave;
an acoustic conducting medium for propagating said acoustic wave; and
an optical fiber having first and second modes which propagate light along a central axis at first and second velocities, respectively, said fiber having a beat length for said modes, said fiber wound around said acoustic conducting medium to provide a plurality of turns of said fiber, at least a portion of the fiber in each turn placed in acoustic contact with said medium, such that said wave stresses said fiber at selected stress locations which propagate along at least a portion of said fiber, said acoustic wave having a wavelength selected in accordance with the beat length of said fiber, each said portion of said fiber positioned such that the central axis of the fiber in each portion is at an angle of incidence greater than 0° and less than 90° relative to the wave fronts of said acoustic wave.

13. A fiber optic frequency shifter, as defined in claim 12, wherein said medium is a rod, and wherein said fiber is wound around said rod in substantially continuous contact with said rod.

14. A fiber optic frequency shifter as defined in claim 13, wherein said means for generating said acoustic wave comprises an acoustic transducer.

15. A fiber optic frequency shifter as defined in claim 12, wherein said light is shifted in frequency by an amount equal to the frequency of said acoustic wave having said wavelength.

16. A fiber optic frequency shifter, comprising:
means for generating an acoustic wave;
an acoustic medium providing an acoustic path for propagating plural acoustic wave fronts from a first location of said medium to a second location of said medium; and
an optical fiber providing an optical path for propagating an optical signal between said first location and said second location, said optical fiber oriented relative to said acoustic medium such that said optical path is longer than said acoustic path, said optical fiber having two propagation modes and a beat length for said modes, said optical fiber having plural turns, at least a portion of each of said plural turns in acoustic contact with said acoustic medium to expose said optical fiber to said acoustic wave fronts to stress said optical fiber at selected stress locations which propagate along at least a portion of said fiber, the beat length of the fiber and the distance between the wave fronts selected such that said stress causes light propagating in one of said modes to be (1) coupled to the other of said modes, and (2) shifted in frequency.

17. A method of shifting the frequency of an optical signal, comprising the steps of:
propagating said optical signal at a first frequency through a plurality of turns of an optical fiber having a central axis, said fiber including two modes of propagation and a beat length for said two modes, said fiber wound with at least a portion of each of said turns in acoustic contact with an acoustic conducting medium;
directing an acoustic signal along said acoustic conducting medium to contact said portions of said turns such that the angle of incidence of the wave fronts of said acoustic signal with respect to the central axis of the fiber is greater than 0° and less than 90°, said acoustic signal having a wavelength selected in accordance with the beat length of said fiber; and
utilizing said acoustic signal to stress said fiber at selected stress locations which propagate along at least a portion of the fiber to cause optical energy of said optical signal propagating in one of said modes to be transferred to the other of said modes and shifted in frequency to a second frequency.

18. The method of claim 17 wherein the shift in frequency of said optical signal is substantially equal to the frequency of said acoustic signal.

19. In a fiber optic frequency shifter comprising an optical fiber having two modes of propagation and a beat length, a method of frequency shifting light, said method comprising:
orienting said fiber to form a coil having plural turns;
exposing said coil to an acoustic wave such that at least a component of said acoustic wave propagates down the axis of said coil, said acoustic wave having a predetermined wavelength; and
utilizing said acoustic wave to stress said fiber at selected stress locations which propagate along said fiber in each of said turns such that the wavelength of said acoustic wave cooperates with the beat length of the fiber to cause said frequency shifting of light by coupling between said modes.

20. A fiber optic frequency shifter, comprising:
an acoustic medium for propagating an acoustic wave having plural wave fronts;
means for generating said acoustic wave; and
plural loops of optical fiber in acoustic contact with said acoustic medium, said fiber oriented such that each of said wave fronts contacts at least a portion of each of said plural loops of said fiber at selected stress locations which propagate along said fiber, said fiber having two modes of propagation which are phase matched to said acoustic wave to cause cumulative coupling and frequency shifting of light between said modes.

21. A fiber optic frequency shifter, as defined by claim 20, wherein said two modes comprise two polarization modes of a birefringent single mode optical fiber.

22. A fiber optic frequency shifter, as defined by claim 21, wherein said fiber has axes of birefringence corresponding to said polarization modes and said fiber includes means for orienting the axes of birefringence of said birefringent fiber in a preselected orientation relative to said acoustic medium.

23. A fiber optic frequency shifter, as defined by claim 22, wherein said orienting means comprises a flat portion formed on the circumference of said fiber for interface with a surface of said acoustic medium.

* * * * *